(12) United States Patent
Levchenko et al.

(10) Patent No.: US 10,747,956 B2
(45) Date of Patent: Aug. 18, 2020

(54) ARTIFICIAL INTELLIGENCE PROCESS AUTOMATION FOR ENTERPRISE BUSINESS COMMUNICATION

(71) Applicants: Roman Levchenko, Berlin (DE); Levgen Sliusar, Berlin (DE)

(72) Inventors: Roman Levchenko, Berlin (DE); Levgen Sliusar, Berlin (DE)

(73) Assignee: DYNAMIC AI INC., La Jolla, CA (US)

( * ) Notice: Subject to any disclaimer, the term of this patent is extended or adjusted under 35 U.S.C. 154(b) by 97 days.

(21) Appl. No.: 16/118,251

(22) Filed: Aug. 30, 2018

(65) Prior Publication Data
US 2020/0073939 A1  Mar. 5, 2020

(51) Int. Cl.
*G06F 40/00* (2020.01)
*G06F 40/30* (2020.01)
*G06N 3/12* (2006.01)
*G06F 40/295* (2020.01)

(52) U.S. Cl.
CPC .......... *G06F 40/30* (2020.01); *G06F 40/295* (2020.01); *G06N 3/126* (2013.01)

(58) Field of Classification Search
None
See application file for complete search history.

(56) References Cited

U.S. PATENT DOCUMENTS

| | | | |
|---|---|---|---|
| 2002/0099738 A1* | 7/2002 | Grant | G06F 9/465 715/234 |
| 2016/0110762 A1* | 4/2016 | Mastierov | G06F 16/355 707/739 |
| 2016/0110763 A1* | 4/2016 | Mastierov | G06Q 30/0269 705/14.53 |
| 2019/0215286 A1* | 7/2019 | Zhou | H04L 51/063 |

\* cited by examiner

*Primary Examiner* — Abul K Azad
(74) *Attorney, Agent, or Firm* — David T. Bennett

(57) ABSTRACT

Disclosed is an automated electronic message processing system that utilizes a combination of machine learning and natural language processing to create a communication system with greater adaptability and capacity for learning. An extension and modification of the general genetic algorithm concept better enables the present system to learn the sense of messages and apply learnt responses to future communications.

2 Claims, 16 Drawing Sheets

FIG. 3

Conditional call of the functions

| Chromosome encoding | Source code | Block Diagram |
|---|---|---|
| [ if-else, [ Func1 ], [ Func2 ], [ Func3 ] ] | bool A = Func1()<br>if (A)<br>  return Func2();<br>else<br>  return Func3(); | |

Loop: "for"

| Chromosome encoding | Source code | Block Diagram |
|---|---|---|
| [ for, i, 0, 10, 1, [ set, A, [ Func1, A, i ] ] ] | int A = 5;<br>for( int i=0; i < 10; i++ )<br>  A = Func1(A, i); | |

Sequential program code

| Chromosome encoding | Source code | Block Diagram |
|---|---|---|
| [ block, [ set, A, 5 ], [Func1 ], [Func2] ] | int A = 5;<br>Func1();<br>Func2(); | A=5 → Func1 → Func2 |

FIG. 8

Recursion

| Chromosome encoding | Source code | Block Diagram |
|---|---|---|
| [ while, A, [ set, A, [ Func1, A ] ] ] | A = 5;<br>while( A )<br>  A = Func(A); | A=5 → Func1 (loop) |

512

| Level of success | Competitive selection with multi-coefficients<br>first coef. = 1, 2, 3; second coef. = a, b, c; third coef. = α, β, γ | | | | | |
|---|---|---|---|---|---|---|
| Level-1 (the best) | | | 3-c-γ | | | |
| Level-2 | | 3-c-β | 3-b-γ | 2-c-γ | | |
| Level-3 | | 3-c-α | 3-a-γ | 1-c-γ | | |
| Level-4 | | 3-b-β | 2-c-β | 2-b-γ | | |
| Level-5 | 3-b-α | 3-a-β | 1-b-γ | 2-a-γ | 1-c-β | 2-c-α |
| Level-6 | | 3-a-α | 1-c-α | 1-a-γ | | |
| Level-7 | | | 2-b-β | | | |
| Level-8 | | 2-b-α | 2-a-β | 1-b-β | | |
| Level-9 | | 2-a-α | 1-b-α | 1-a-β | | |
| Level-10 (the worst) | | | 1-a-α | | | |

FIG. 24

ARTIFICIAL INTELLIGENCE PROCESS AUTOMATION FOR ENTERPRISE BUSINESS COMMUNICATION

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of artificial intelligence, computational linguistics, and automated communication.

Background of the Invention

Computational linguistics is a field of study that specializes in the application of processing natural language by computers. Advances in computational linguistics have led to the developments of often-relied upon device features such as spellcheck tools, computer translators, and speech recognition software (e.g., Apple®'s Siri feature).

While advancements in the study of computational linguists have facilitated better application to computers, significant problems still exist. For example, some of the most prevalent problems include recognizing syntactic structure of sentences, resolving reference of pronouns, and inability to resolve ambiguities through failure to make use of context.

One of the approaches for automating solutions of search problems in various computational domains is genetic algorithms. Genetic algorithms can be used to conduct searches for other algorithms, which in turn solve distinct problems in the field of computational linguistics and Machine Learning. As a form of artificial intelligence, genetic algorithms essentially produce algorithms to analyze accumulated knowledge in various ways in order to make decisions and achieve automation.

Machine Learning is another commonly used technology that enables systems to progressively improve performance on specific tasks through statistical techniques. However, this is an involved process that requires human intervention to classify the sense of messages and subsequently integrate each new classification into the system. This approach is a significant resource burden, and, though these systems accumulate knowledge, they remain inflexible during their lifecycles.

Thus, a need exits for a dynamic system that more effectively accumulates knowledge without human intervention.

SUMMARY OF THE INVENTION

The present invention relates to software implemented on computer hardware including artificial intelligence and the application of computer linguistics to streamline automated communication between businesses and its customers or employees.

It is an object of the present invention to provide software methodologies that direct the operation of computer hardware to produce an automated electronic message processing system that utilizes Machine Learning to learn the sense of language used in an incoming communication or correspondence and reply to the correspondence without the intervention and support of human engineers. One embodiment of the invention involves collecting incoming messages from various channels (e.g., instant messaging, e-mail, chats, issue trackers, etc.), processing the text or audio of the messages for language known to the computer and system, and then suggesting and/or providing a responsive outgoing communication e.g. in the same format (text or audio) of the incoming message. Another embodiment of the present invention is a memory mechanism to enable the system to integrate and mimic techniques provided by human operators for future use. For example, should the system be unable to suggest a response, due to lack of previously learnt cases, the request is handed to a human operator. The response provided by the human operator is integrated into the system's memory and utilized by the system in response to similar requests in the future.

Another object of the present invention is provide a system that utilizes Machine Learning techniques for classification of language to provide building blocks for another Machine Learning engine that drives genetic algorithms to automatically generate a program code for the classification system. Such genetic algorithms are commonly used to generate solutions to optimization and search problems by relying on certain operators. These algorithms work in some cases by taking a set of solutions (sometimes called chromosomes) from one population to form a new and, often, better population. Solutions are then repeatedly iterated to continually form new solutions and populations until a particular condition is satisfied or achieved. Modeling the artificial messaging system off this evolutionary computation process offers a great degree of flexibility, as the continuous self-learning allows the system to evolve during its lifecycle by increasing probability of prediction and lowering error rate. In a typical embodiment, the system is continuously modifying and reconsidering its classification groups independently, without requiring the manual input of classifications from engineers, which enables it to adapt to human understanding of texts in real-time.

In yet another embodiment, the system offers fully automated learning without the need to employ programmers to manually retrain, analyze data, and implement new processing rules. The system makes use of a program code generation based on genetic algorithm and its linguistic feature representation. Further, the system does not need the data to be pre-processed before being fed in for learning, enabling the system to learn from live communicative activity.

Another object of the present invention is provide a system that gives the operator of the system the ability to control accuracy of the search when looking up the response and hence be able to maintain a balance between quality of the responses and quantity of messages responded automatically by the system.

In a further embodiment, the system continually broadens its resource pool and improves efficiency (prediction probability and error probability) because the system is continuously learning from new manual responses as well as reconsidering older ones. In yet another embodiment, the system is implemented as a multi-agent architecture allowing for cloud and on-premises deployment as well as integration with various messaging systems based on customer needs.

In view of the foregoing, an object of this specification is to disclose a process automation for enterprise business communication.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 3 is another example of a variant of supported algorithmic structures with C-like pseudo-code and its representations;

FIG. 4 is another example of a variant of supported algorithmic structures with C-like pseudo-code and its representations;

FIG. 7 is another example of a variant of supported algorithmic structures with C-like pseudo-code and its representations;

FIG. 8 is another example of a variant of supported algorithmic structures with C-like pseudo-code and its representations;

FIG. 24 is an example of competitive selection of chromosomes done by more than one distinct metric;

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Figure 1:
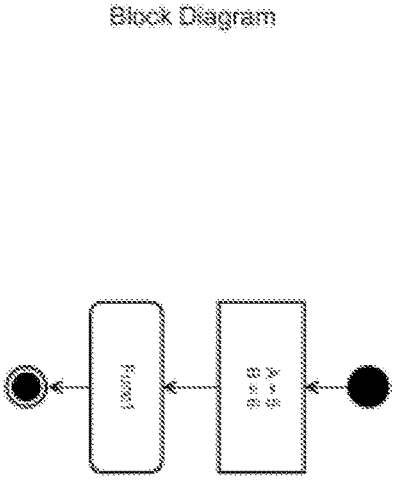
FIG. 1 is an example of a variant of supported algorithmic structures with C-like pseudo-code and its representations.

FIG. 1 shows an example of tuple for encoding a function call with parameters. As shown, the function name provided "Func1" represents some built-in function which has implementation available in the simulation subsystem.

Figure 2:
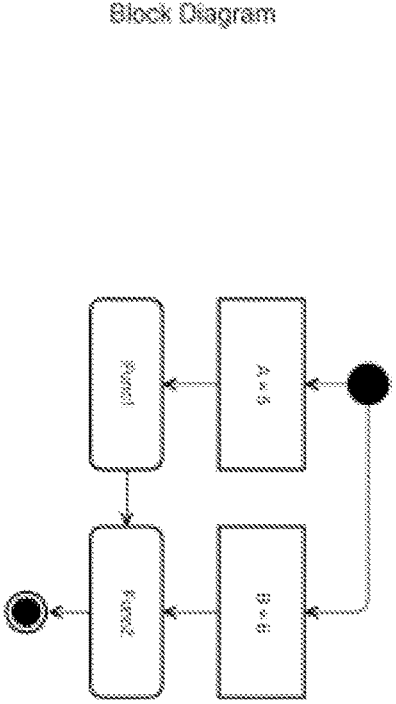
FIG. 2 is another example of a variant of supported algorithmic structures with C-like pseudo-code and its representations.
Figure 5:
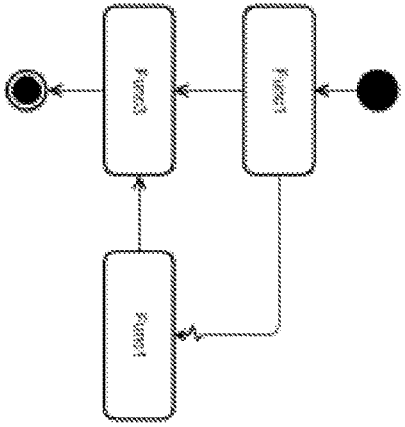
FIG. 5 is another example of a variant of supported algorithmic structures with C-like pseudo-code and its representations.

FIG. 2 shows an encoding example of nested call. As shown in the figure, the result of function "Func1" is substituted to parameter of "Func2". FIG. 2 also shows a second level to the syntax tree, containing invocation of "Func1." Such function invocations can nest further to any finite number of levels.

FIG. 3 shows an example of a conditional clause implementation. As shown, the notation of "if-else" is built-in for such a case. During computation, the result of the specific branch "Func2" or "Func3" is substituted in place of the whole clause.

FIG. 4 shows an example of an alteration over an ordered set of integer values. As shown, a counter variable ("i"), initial, final and incremental values are all placed in the notation.

Figure 6:
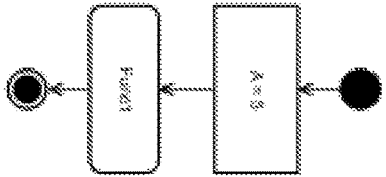
FIG. 6 is another example of a variant of supported algorithmic structures with C-like pseudo-code and its representations.

FIG. 6 shows an example of the assignment of a value to a variable. Such a structure is used to define custom variables as well. The pattern shown can be used to catch exceptions thrown by built-in functions.

Figure 10:
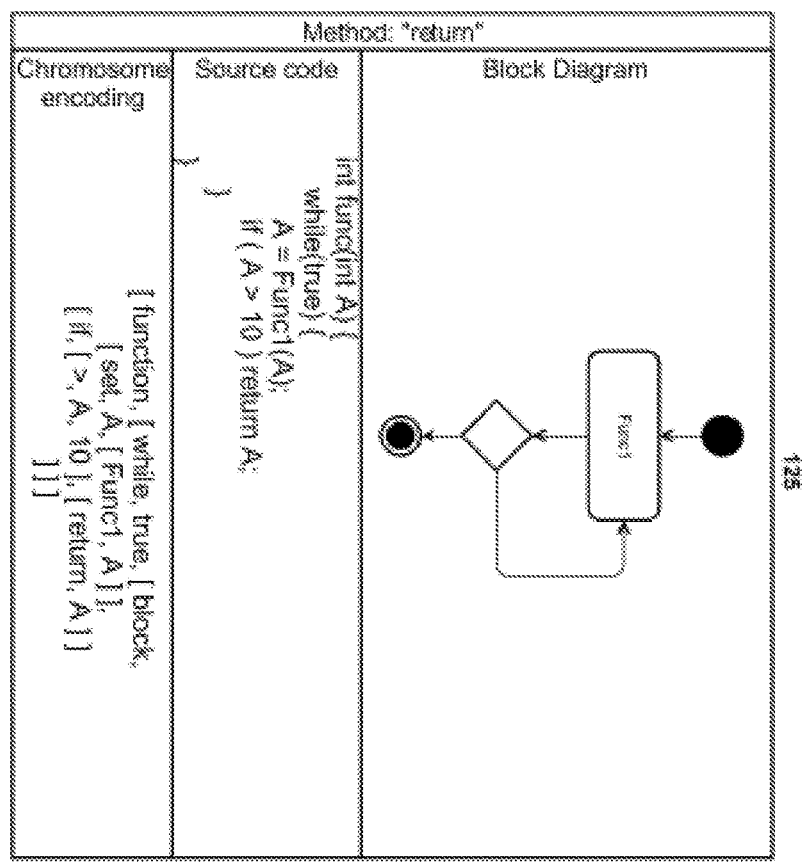
FIG. 10 is another example of a variant of supported algorithmic structures with C-like pseudo-code and its representations.

FIG. 7. shows an example of sequential execution of multiple algorithm structures. Though the result of such block is void, it can contain a "return" clause, as shown in FIG. 10. In that case, calculation will immediately follow the sub-tree up to the nearest "function" definition with its returned value during computation.

Figure 9:
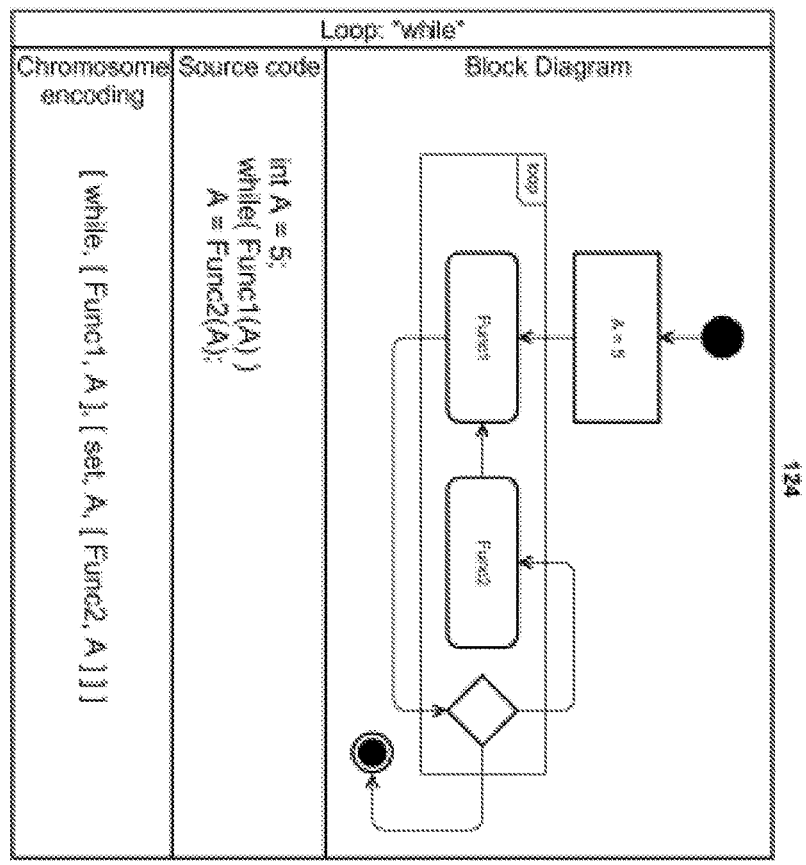
FIG. 9 is another example of a variant of supported algorithmic structures with C-like pseudo-code and its representations.

FIG. 9 shows an example of a type of iteration with condition checking—also known as a "while" loop. Such a loop can also be used to implement recursion in the example shown in FIG. 8.

Figure 11:
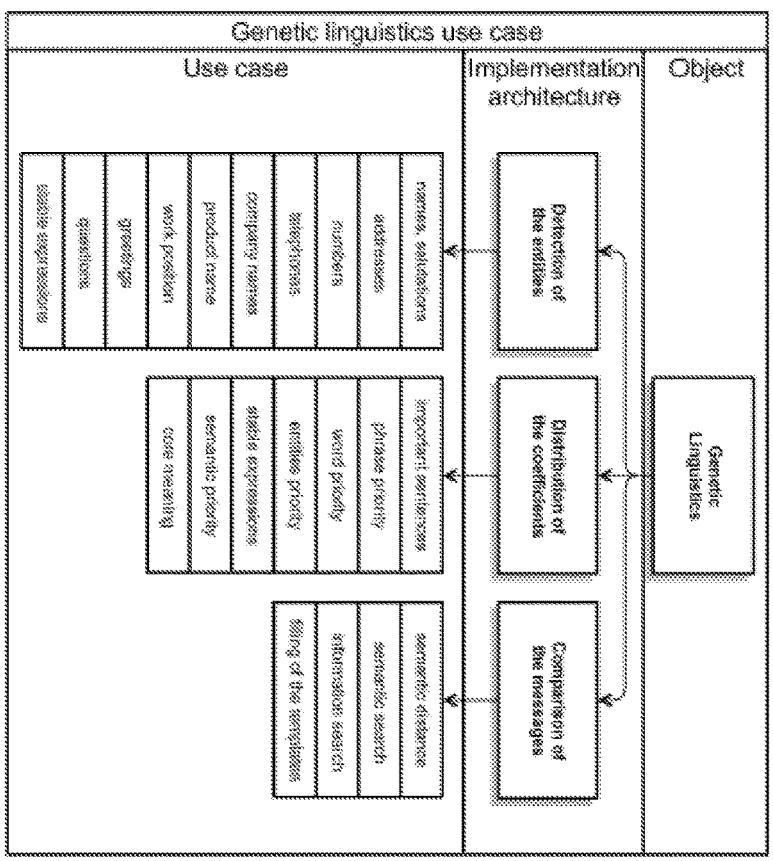
FIG. 11 is an example of applications of modified genetic algorithm for linguistics'

FIG. 11 shows an example of applications of modified genetic algorithm for linguistics. One type of program, constructed after chromosomes, can operate on text. Another type of program for entity recognition is used to mark up the input text with detected, and known, entities (such as names, dates, greetings, popular expression, etc.) by assigning Boolean tags to work and/or groups of words. Another type pf program can map floating-point or integer coefficients to parts of text and is used to mark significant sentence portions such as the priority of words in a sentence or the sentence importance. Yet another type of program compares two message and returns a probability based on the equality of sense. This type of application of modified genetic algorithm allows the implementation of semantic distance evaluation as well as information and semantic search—enabling progressive learning from real-message database. A machine can utilize such a technique and learn by adapting its models (or "chromosomes") for kinds of text that is specific to the relevant customer.

Figure 12:
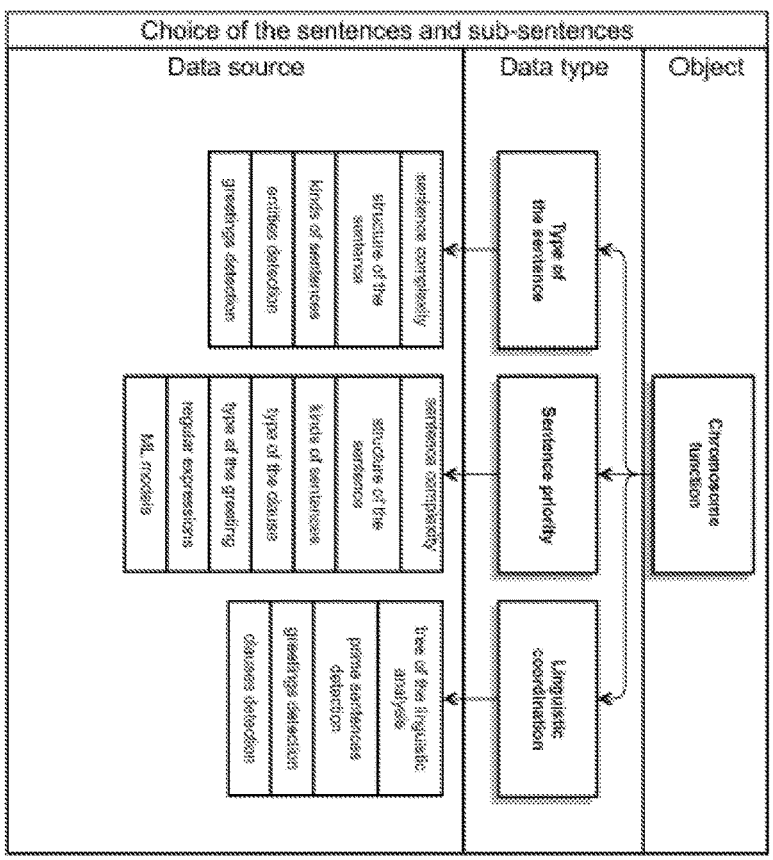
FIG. 12 is an example of a type of built-in function used in a simulator that interprets algorithms encoded in chromosomes.

FIG. 12 shows a variety of approaches that can be used for selecting sentences and sub-sentences. As shown, in determining the type of sentence, the program can refer to functions assessing sentence complexity, kind of sentence (question, exclamation, regular, etc.), detecting greetings, and identifying the presence of specific entities. Information gathered at this stage can then be fed into a sentence priority evaluation program—a program which may then use Machine Learning, statistical models, linguistic sentence structure references, or regular expressions.

Figure 13:
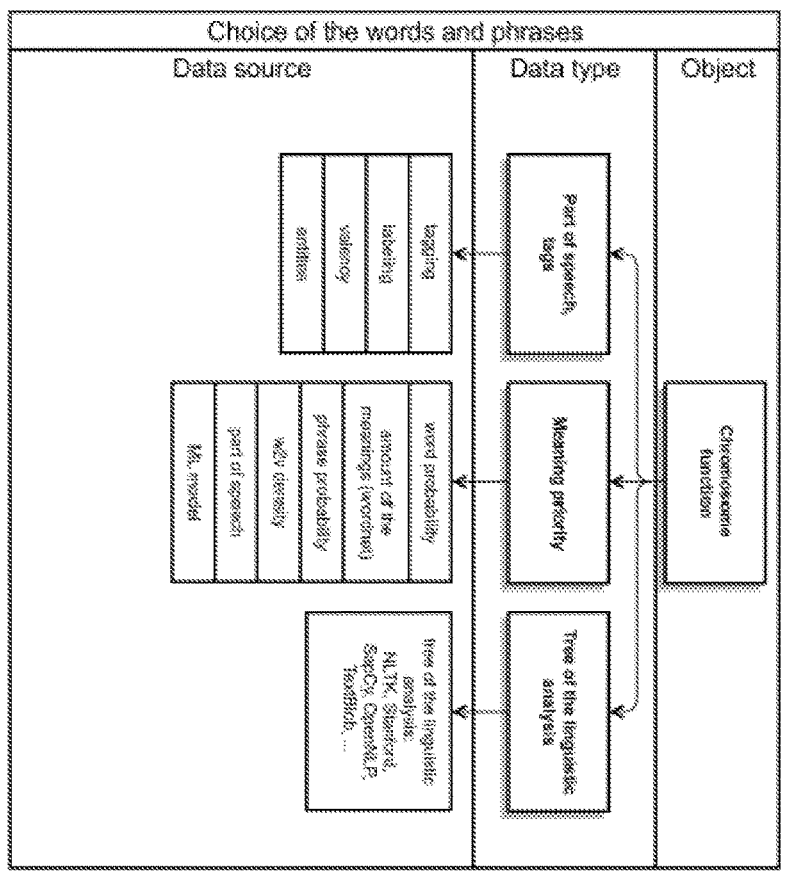
FIG. 13 is another example of a type of built-in function used in a simulator that interprets algorithms encoded in chromosomes.

FIG. 13 shows various approaches for the linguistic coordination of text. Such functions allow traversing the tree of linguistic characteristics of text fragments. For the selection of words and phrases over the text, the chromosome-encoded program can refer to parts of speech, labels, valency, and other linguistic characteristics of individual words and phrases and prioritize them by meaning determined from common built-in callouts such as WordNet and word2vec density, as well as statistical and Machine Learning models. Tree of linguistic analysis built by common tools (such as NLTK) is also accessible on every stage.

Figure 14:
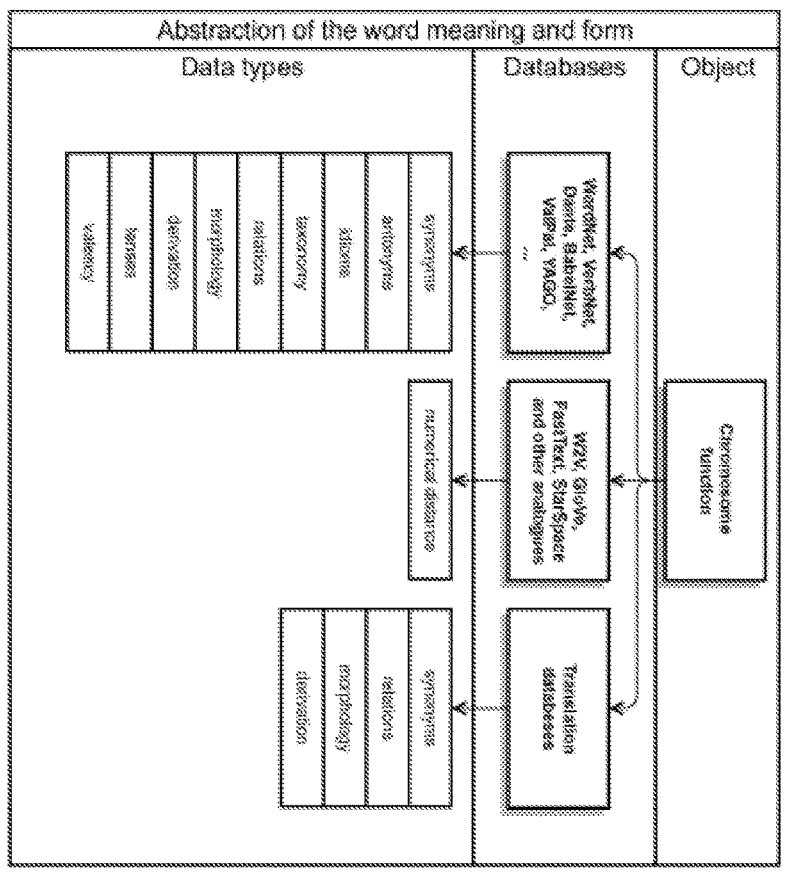
FIG. 14 is another example of a type of built-in function used in a simulator that interprets algorithms encoded in chromosomes.

FIG. 14 shows examples of possibilities to implement abstraction and generalization of work form and meaning. The program can make substitutions and comparisons based on common translation and relation databases. Such databases include: WordNet and VerbNet. Further, the program can make substitutions and comparisons to find synonyms, antonyms, tenses, and valency.

Figure 15:
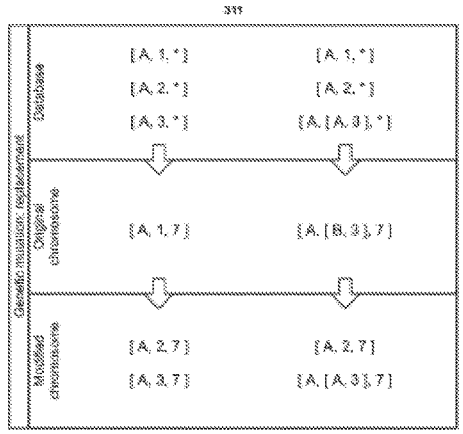
FIG. 15 is an example of a type of mutation used by a modified genetic algorithm in conjunction with a chromosome example.
Figure 16:
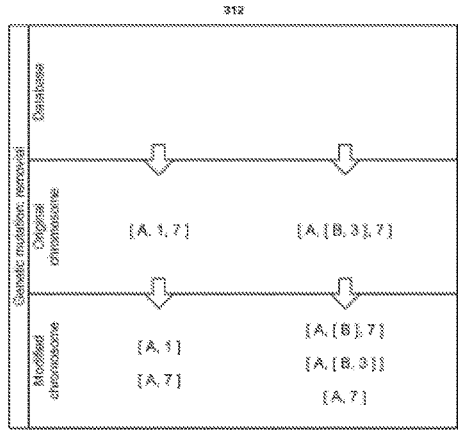
FIG. 16 is another example of a type of mutation used by a modified genetic algorithm in conjunction with a chromosome example.
Figure 17:
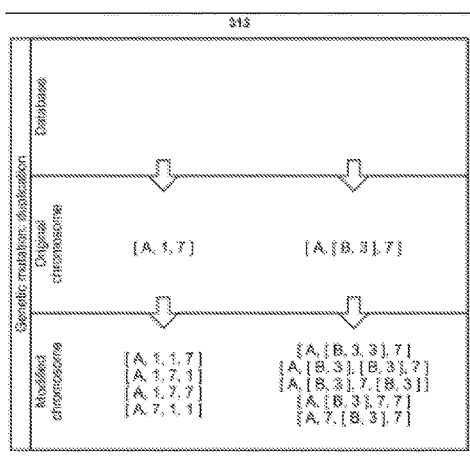
FIG. 17 is another example of a type of mutation used by a modified genetic algorithm in conjunction with a chromosome example.
Figure 18:
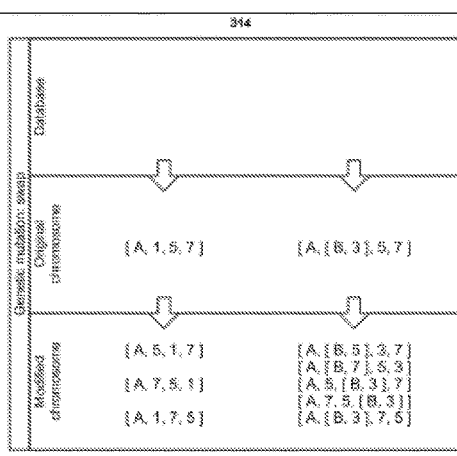
FIG. 18 is another example of a type of mutation used by a modified genetic algorithm in conjunction with a chromosome example
Figure 19:
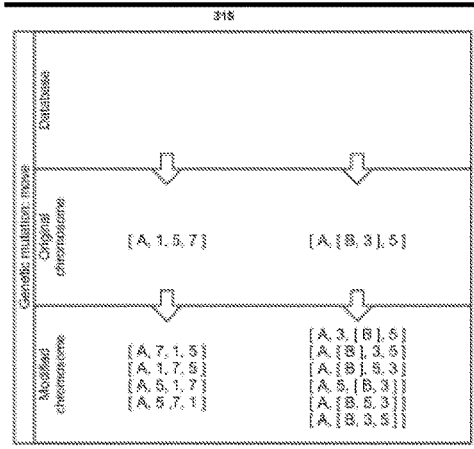
FIG. 19 is another example of a type of mutation used by a modified genetic algorithm in conjunction with a chromosome example.
Figure 20:
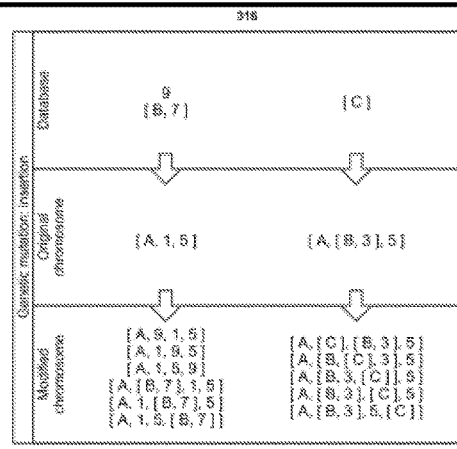
FIG. 20 is another example of a type of mutation used by a modified genetic algorithm in conjunction with a chromosome example.

FIG. 15 shows an example of a replacement mutation used by a genetic algorithm with a chromosome example. The replacement mutation, as shown in FIG. 15, replaces one function parameter in the original chromosome by another value from variant space stored in the database. Such value can be predetermined and/or learnt from previous generations. Further, it can replace one leaf or subtree with another lead or subtree in the syntax tree of the chromosome. FIG. 16 is an example of a removal mutation, in which one point of the subtree from the original chromosome is removed. FIG. 17 is an example of a duplication mutation, in which a copy of a leaf of subtree at some level of the whole tree is inserted somewhere at the same level. FIG. 18 is an example of a swap mutation, in which a chosen subtree or leaf is exchanged with another subtree or leaf. Such mutation can operate on multiple levels of the tree. FIG. 19 is an example of a move mutation, in which a subtree or leaf is removed from one position and inserted somewhere else in the tree. FIG. 20 is an example of a insertion mutation, in which a fragment from the database (containing a set of predetermined fragments) is inserted into a random place of the original chromosome.

Figure 21:
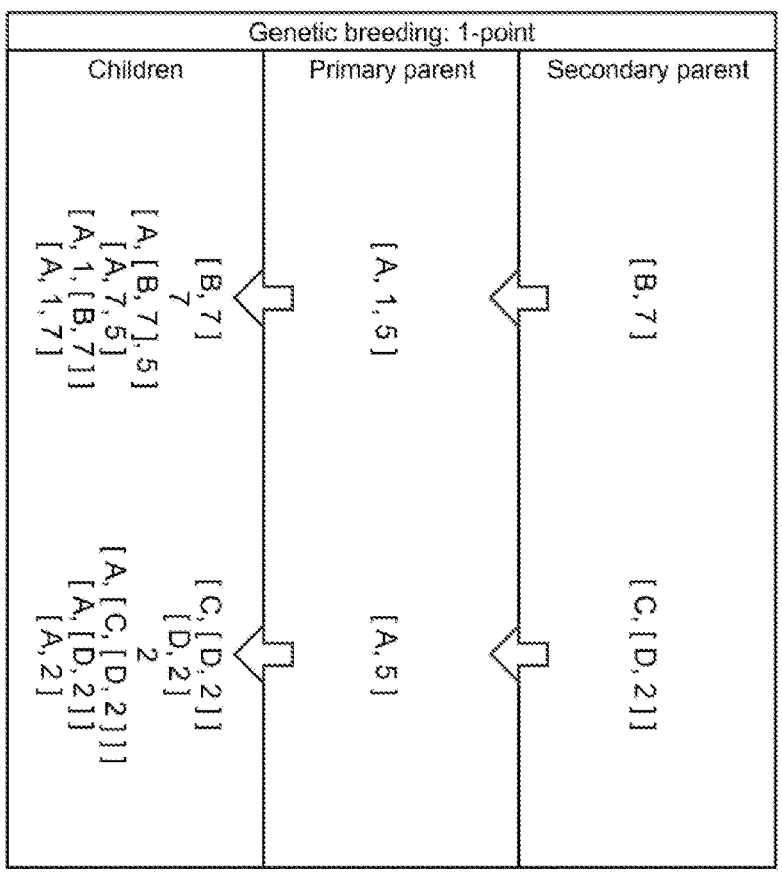
FIG. 21 is an example of a breeding strategy of a genetic algorithm.
Figure 22:
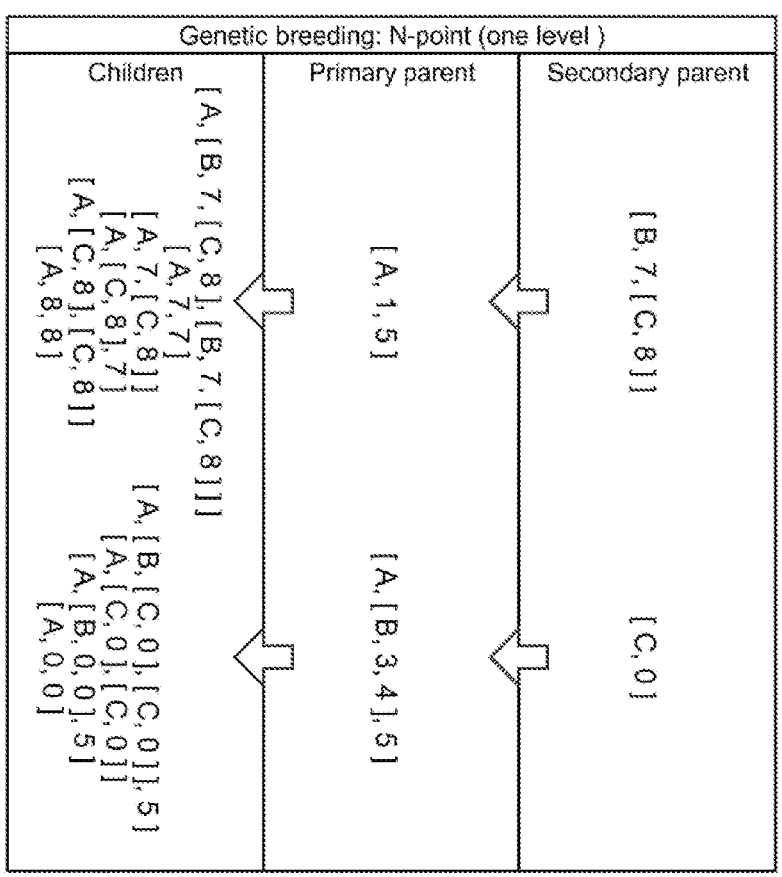
FIG. 22 is another example of a breeding strategy of a genetic algorithm.

FIG. 21 is an example of one-point breeding. As shown in FIG. 21, this type of breeding suggests replacing one fragment from a primary parent with exactly one fragment from a secondary parent chromosome. As shown in FIGS. 21 and 22, a whole chromosome or part of a chromosome can be replaced with a whole chromosome or part of a chromosome. FIG. 22 shows an example of N-point breeding. As shown in FIG. 22, this type of breeding suggests replacing multiple fragment at the same level of the tree in the primary parent chromosome with one fragment taken from the secondary parent.

Figure 23:
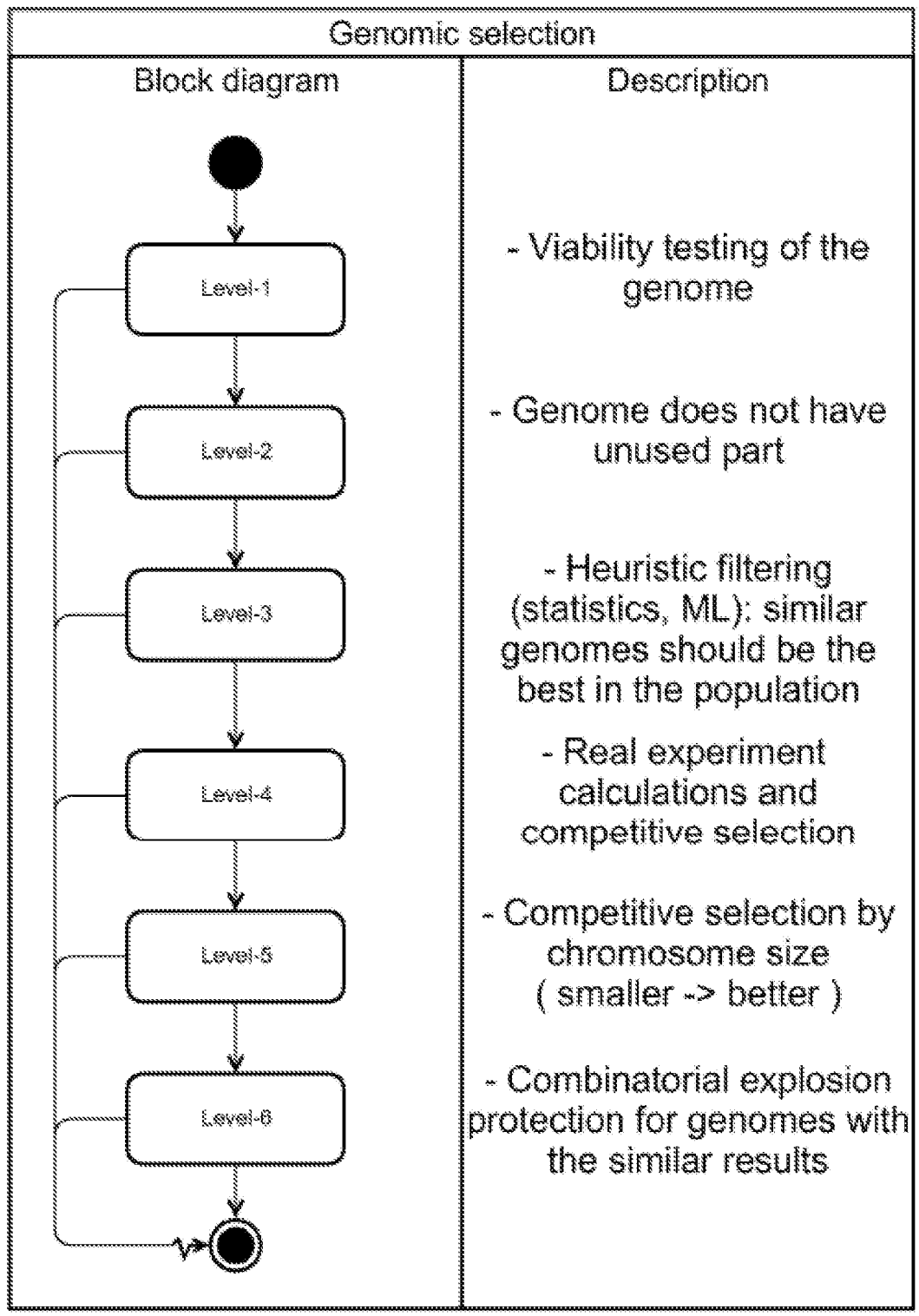
FIG. 23 is an example of steps for a single iteration of a genetic selection process.

FIG. 23 shows a flow chart demonstrating an example of a single iteration genetic selection process. As shown in FIG. 23, at the first level ("Level-1"), the chromosomes are checked for syntactic correctness (for example, function call sites and control structures have exact needed number of arguments). At the second level ("Level-2"), checks for unreachable code fragments are performed—chromosome having such fragments are considered nonviable. Next, the heuristic engine (which can be based on Machine Learning or statistics model) is used to predict viability of the chromosomes based on properties of viable chromosome of previous generations. At the fourth level ("Level-4"), a competitive selection is made with every chromosomal program run on a large set of annotated data—with known results—to assess its accuracy. At the fifth level ("Level-5"), another competitive selection is mad, now based on the chromosome size, with smaller sizes being preferable. Only one chromosome from the number of chromosomes with identical results is taken at the $6^{th}$ level ("Level-6") to protect against combinatorial explosion. Chromosomes that surpass the $6^{th}$ level (Level-6) are then considered the "next generation."

FIG. 24 is an example of competitive selection of chromosomes done by more than one distinct metric. As shown in FIG. 24, an approach is taken that puts the chromosomes with the highest viability (based on all the parameters) at the highest level ("Level-1"). Chromosomes having low viability by one parameter, but high for others, are put at "Level-2" and so on. The lowest level ("Level-10") is occupied by chromosomes with low viability by all the parameters.

Figure 25:
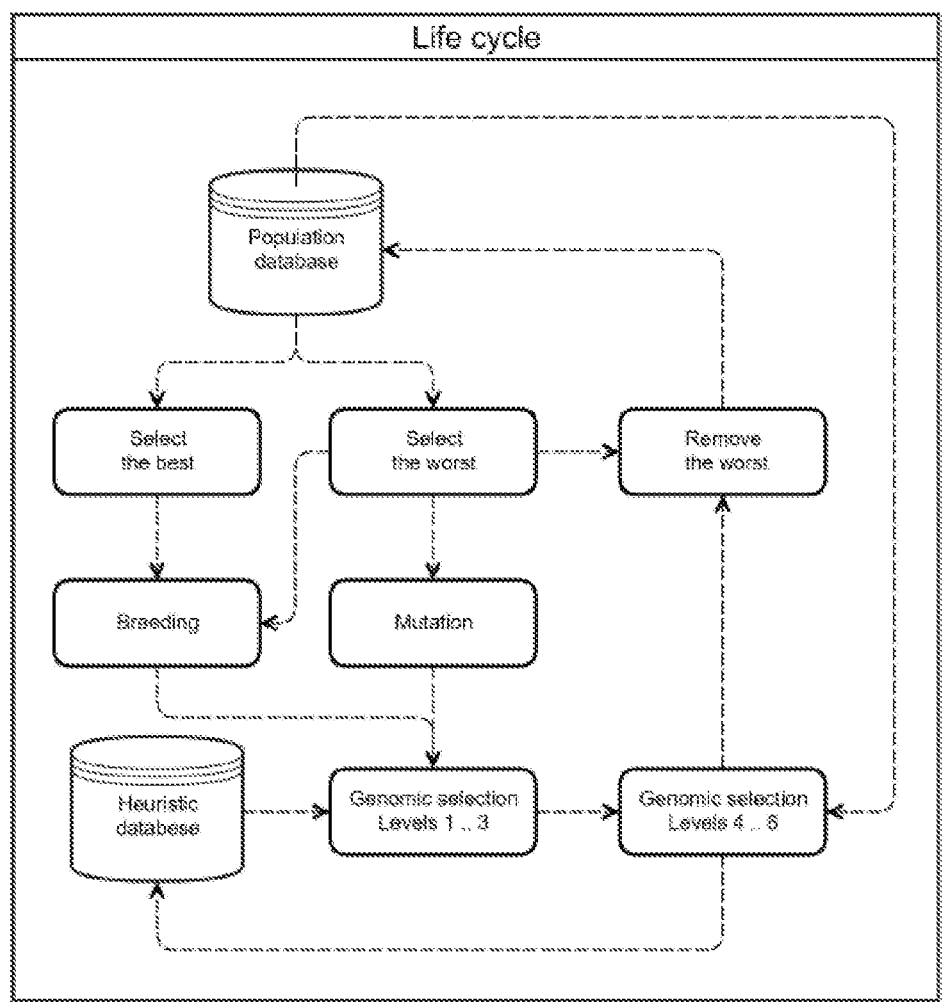
FIG. 25 is an example of a life cycle of the modified genetic algorithm.

FIG. 25 shows an example of a life cycle of the modified genetic algorithm. As shown in FIG. 25, the best viable chromosomes from the previous generation are selected from the database to become breeding primary parents. Meanwhile, the worst viable chromosomes are selected to become secondary parents and for mutation. Breeding is then applied to selected sets of parent chromosomes to produce children chromosomes. Additionally, every secondary parent chromosome is mutated once each cycle. A new population is hence formed comprising the children and mutants. The genetic selection process begins with a filtering of the population based on chromosome integrity and heuristics of previous generations. This is accomplished on Levels 1 through 3. At Levels 4 through 6, real competitive selection is performed and results are fed into the heuristics database for learning. A new generation is then added to the population database.

Figure 26:
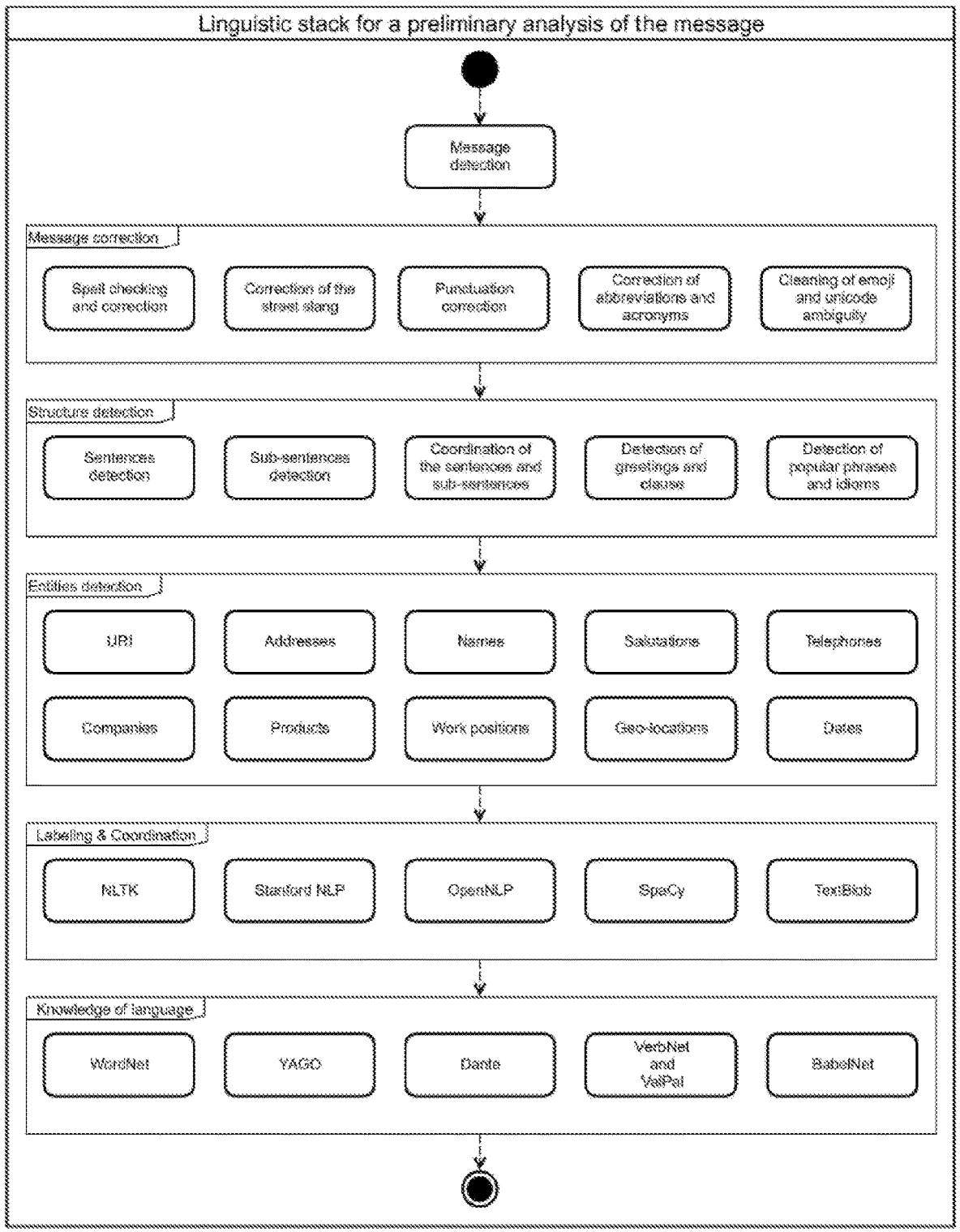
FIG. 26 is an example of a linguistic analysis stack as used to process a single message.

FIG. 26 shows a linguistic analysis stack, used to process a single message. As shown, when a new message is detected on the input stream, it can have various defects due to human mistakes. A message correction layer does spell checking, replaces street slang terms with normal equivalents, tries to correct punctuation and common abbreviations and acronyms (e.g., RSVP). The "Message Correction" layer can also clean and replace the use of emojis and ambiguous Unicode symbols. The corrected message is then fed to a "Structure Detection" layer. The purpose of the "Structure Detection" layer is to selection sentences and sub-sentences amongst a text message and then find relations between them. This layer also serves to detect specific popular phrases and idioms, as well as greeting phrases and clauses. Next, as shown in FIG. 26, the "Entity Detection" layer looks for common formats of various object descriptions (such as names, locations, dates, times, telephone numbers, work positions, etc.) and replaces them with placeholders in the text of the message while saving original values in the metadata. Text produced from these layers is then ready for labeling and linguistic coordination. Standard tools (such as NLTK, Stanford POS Tagger, SpaCy, etc.) can be used for this process and are able to generate more accurate results as compared to messages that are not preprocessed through the layers as shown in FIG. 26. The final layer, the "Knowledge of Language" layer, is used to find sense of words and phrases, after which messages can then be compared in terms of cognitive synonyms and infinitive forms.

Figure 27:
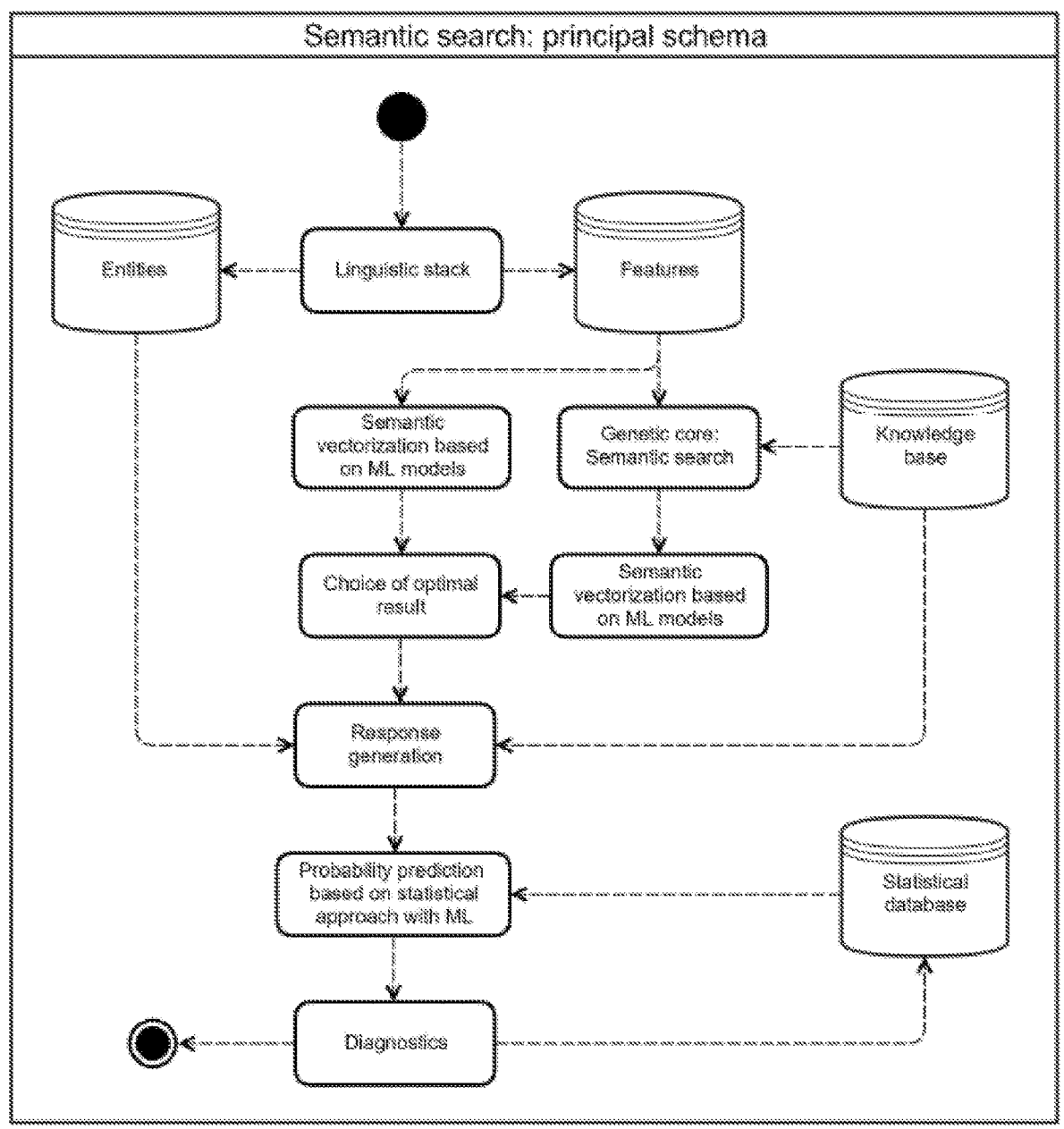
FIG. 27 is an example of an overview of an automated response system based on a semantic search.

FIG. 27 shows an example of an overview of an automated response system based on a semantic search. As shown in FIG. 27, the input message is first fed into the linguistic stack described and shown in FIG. 26, which produces an entity set of the message as well as a tree of linguistic features of the text. That representation is then fed into two different types of processing. The first type is a semantic vectorization, based on Machine Learning models, which is accomplished using neural networks. The second type is a genetic code, where the message is compared with another message from the knowledge base by means of program code found by modified genetic algorithm shown in FIGS. 15-25. Best (in terms of exactness) messages from the knowledge base are then fed into the same semantic vectorization models as were previously used in the first type of processing. At the next stage, results of semantic vectorization from both types are compared and, from all the messages found by genetic code, the closest one, with the closest vector to the original message, is selected. The following stage forms a response message by submitting entities from initial messages to the response template found in the knowledge base. Then request and response messages are fed into a probability prediction engine, which uses statistics and Machine Learning techniques to assess degree of accuracy in the answer. Diagnostics and feedback data will then be collected in various ways, depending on message delivery channel (e.g., e-mail, instant messaging, etc.), and is used to train the prediction engine.

Figure 28:
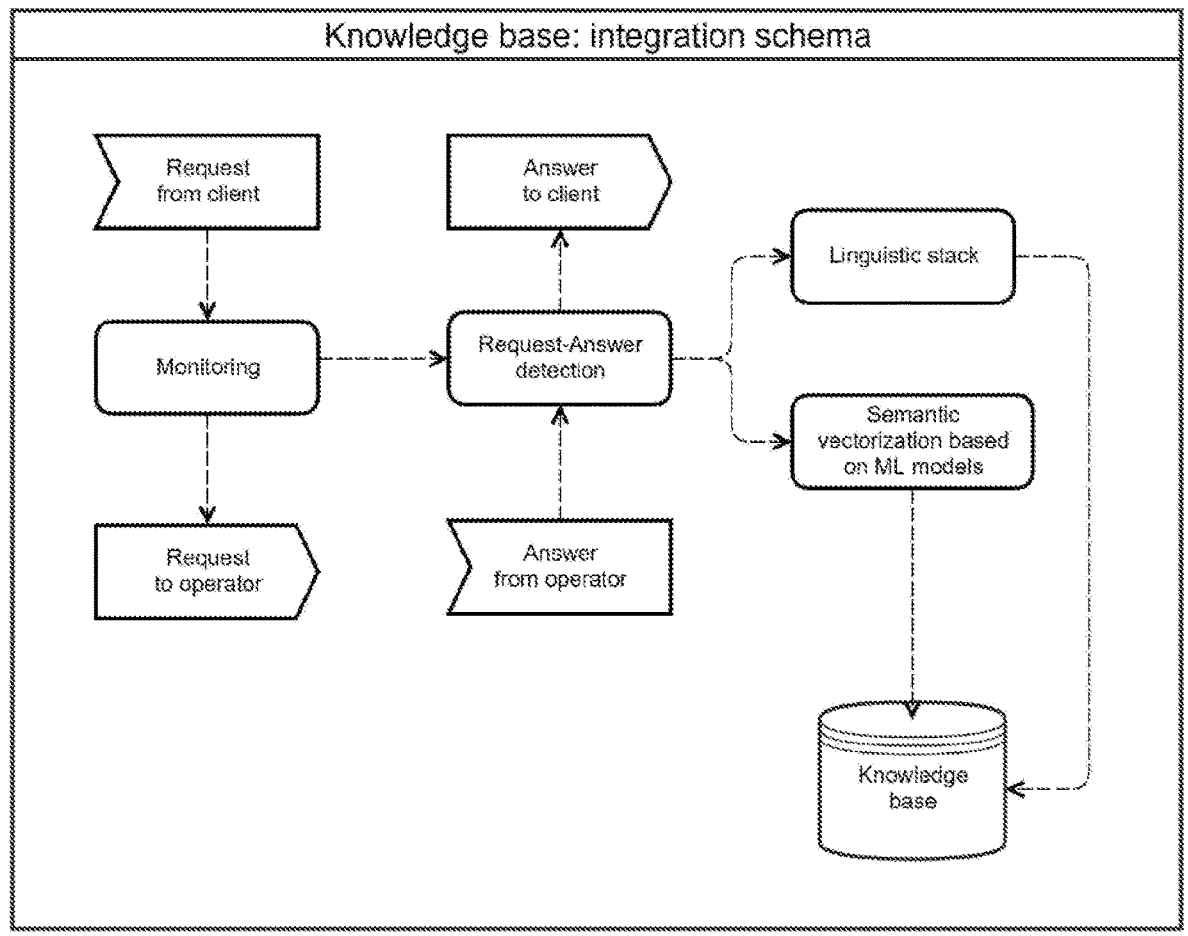
FIG. 28 is an example of the workflow for filling the knowledge base used by the system.

FIG. 28 shows the workflow for filling the knowledge base used by the system. A request from a client is captured by the input channel monitoring services and is fed to the system. If the system has located a satisfactory answer, then it is fed to the "Request-Answer Detection" module as a machine response. If the system does not find a satisfactory answer, the request is posted to a human operator. The "Request-Answer Detection" module will then pick up the operator's answer instead of a machine generated response. Either the machine generated response or operator response is sent to the client and a request-answer pair is formed. Request and answer messages are fed through the "Linguistic Stack" to record its features to be used by genetic code for comparison, and through vectorization models to produce a vector profile for vector comparison stages. Results are then store to the "Knowledge Base" along with the link between the request and answer.

Figure 29:
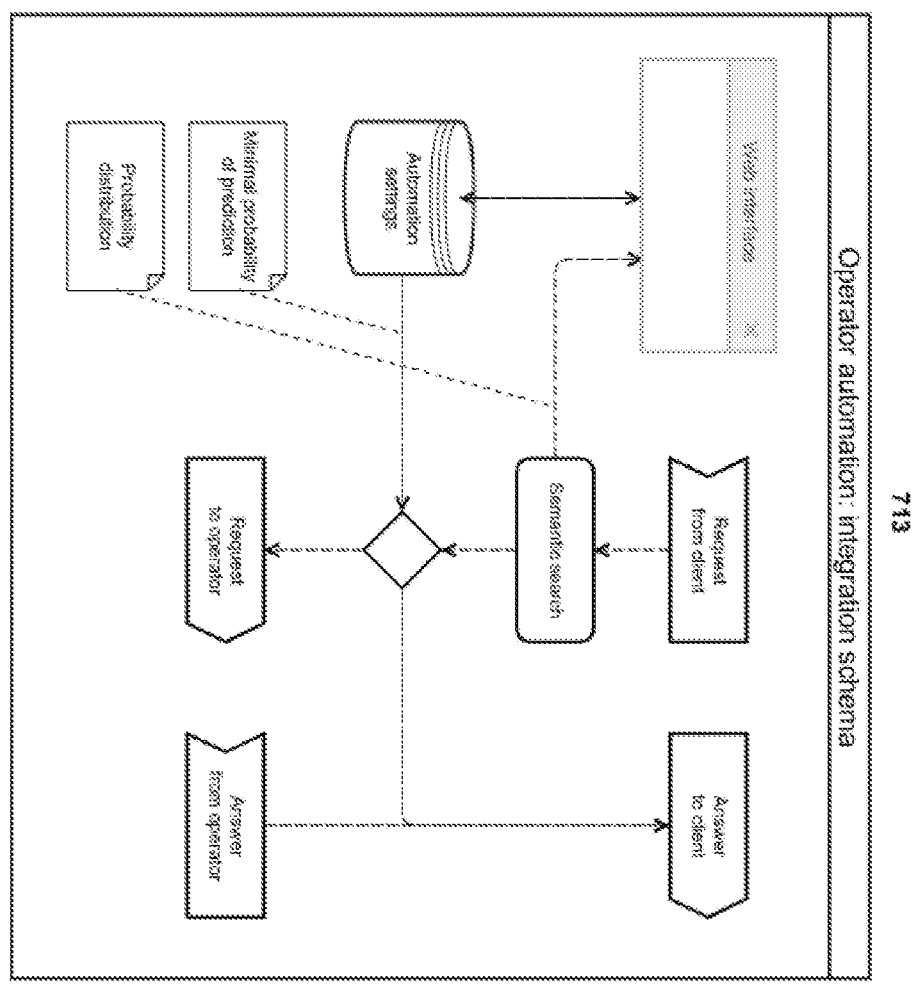
FIG. 29 is an example of the operator workflow.

FIG. 29 shows the operator workflow. Probability distribution of automated responses is constantly monitored and displayed in the web interface through which a manager can modify automation settings. Minimal probability of prediction defines the probability of a correct answer predicted by the automated prediction engine for the input message—for which the message can be automatically answered. Otherwise, that particular request is sent to a human operator and the system will collect the human answer to fill the knowledge base.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

PAPER "SEQUENCE LISTING"

Not applicable.

We claim:

1. An automated electronic message processing system comprising:
   A tuple for encoding a function call with parameters;
   A nesting function call integrated into a syntax tree;
   A conditional clause implementation function;
   An inputted variable defining, assigning, and valuing function;
   A sequential execution of multiple algorithms function;
   An iteration with condition checking function;
   An application of various types of modified genetic algorithms for linguistics;
   An information gathering program;
   A linguistic coordination of text function;
   A substitution and comparison based on common translation and relation databases function;
   A replacement, removal, duplication, swap, insertion, and move mutation functions used by a genetic algorithm;
   A modified genetic algorithm;
   A single iteration genetic selection process;
   A linguistic analysis stack function; and
   A direction function that directs inputted requests to human operators.

2. The processing system of claim 1 wherein the modified genetic algorithm further comprises:
   A database from which the modified genetic algorithm selects variables (chromosomes) to become breeding primary parents;
   A child population comprising new child chromosomes resulting from the breeding of said selected variables from said database;
   A mutation function that mutates a number of the said selected variables from said database;
   A new population of chromosomes comprising said new child chromosomes and a number of mutant variables resulting from said mutation function;
   A filtering function that organizes the said new population of chromosomes; and
   An addition function that adds new variables (chromosomes) to said database.

* * * * *